(12) United States Patent
Blackmon et al.

(10) Patent No.: US 6,879,559 B1
(45) Date of Patent: Apr. 12, 2005

(54) ROUTER LINE CARD PROTECTION USING ONE-FOR-N REDUNDANCY

(75) Inventors: Harry C. Blackmon, Plano, TX (US); Tony M. Brewer, Plano, TX (US); Harold W. Dozier, Dallas, TX (US); Jim Kleiner, Dallas, TX (US); Thomas C. McDermott, III, Plano, TX (US); Gregory S. Palmer, Plano, TX (US); Keith W. Shaw, Plano, TX (US); David Traylor, Richardson, TX (US)

(73) Assignee: Chiaro Networks, Ltd., Richardson, TX (US)

( * ) Notice: Subject to any disclaimer, the term of this patent is extended or adjusted under 35 U.S.C. 154(b) by 762 days.

(21) Appl. No.: 09/703,043

(22) Filed: Oct. 31, 2000

(51) Int. Cl.[7] ................................................. H04L 1/22
(52) U.S. Cl. ........................ 370/225; 370/216; 370/227; 370/228; 370/392; 370/471; 370/473; 398/24; 398/83
(58) Field of Search ................................. 370/225–228, 370/242, 246, 274, 279, 293, 315, 492, 501, 216, 217, 218, 219, 220, 221, 404, 392, 393, 473, 471; 709/250

(56) References Cited

U.S. PATENT DOCUMENTS 4,160,127 A * 7/1979 Slana et al. .................. 370/217
4,579,079 A * 4/1986 Nundy ......................... 118/405

(Continued)

OTHER PUBLICATIONS

U.S. Appl. No. 09/703,057, Brewer et al., filed Oct. 31, 2000.

(Continued)

*Primary Examiner*—Phirin Sam
*Assistant Examiner*—Anthony Ton
(74) *Attorney, Agent, or Firm*—Fulbright & Jaworski LLP

(57) ABSTRACT

Router line cards are partitioned, separating packet forwarding from external or internal interfaces and enabling multiple line cards to access any set of external or internal data paths. Any failed working line card can be switchably replaced by another line card. In particular, a serial bus structure on the interface side interconnects any interface port within a protection group with a protect line card for that group. Incremental capacity allows the protect line card to perform packet forward functions. Logical mapping of line card addressing and identification provides locally managed protection switching of a line card that is transparent to other router line cards and to all peer routers. One-for-N protection ratios, where N is some integer greater than two, can be achieved economically, yet provide sufficient capacity with acceptable protection switch time under 100 milliseconds. Alternatively, protect line cards can routinely carry low priority traffic that is interruptible, allowing the protect line card to handle higher priority traffic previously carried by a failed working line card. This approach renders unnecessary engineering a network for less than full capacity to allow rerouting in the event of individual line card failure. Consequently, all data paths can be fully utilized. If a particular interface module on one data bus needs removal for maintenance, a duplicate data bus is available intact, allowing hot replacement of any working or protect interface module, even while a line card protection switch is in effect.

33 Claims, 7 Drawing Sheets

U.S. PATENT DOCUMENTS

| | | | | |
|---|---|---|---|---|
| 4,658,396 | A | * | 4/1987 | Barden .................. 370/221 |
| 5,014,261 | A | * | 5/1991 | Shinbashi et al. .......... 370/220 |
| 5,583,859 | A | * | 12/1996 | Feldmeier ................ 370/471 |
| 5,596,569 | A | | 1/1997 | Madonna et al. |
| 5,740,157 | A | * | 4/1998 | Demiray et al. ........... 370/219 |
| 5,796,717 | A | * | 8/1998 | Shinbashi et al. .......... 370/216 |
| 5,831,970 | A | * | 11/1998 | Arao ..................... 370/227 |
| 5,923,643 | A | | 7/1999 | Higgins et al. |
| 5,937,169 | A | * | 8/1999 | Connery et al. ........... 709/250 |
| 6,151,318 | A | * | 11/2000 | Woodward et al. ......... 370/392 |
| 6,298,038 | B1 | * | 10/2001 | Martin et al. .............. 370/216 |
| 6,324,162 | B1 | * | 11/2001 | Chaudhuri ................ 370/225 |
| 6,332,198 | B1 | | 12/2001 | Simons et al. |
| 6,377,543 | B1 | * | 4/2002 | Grover et al. ............. 370/227 |
| 6,445,717 | B1 | * | 9/2002 | Gibson et al. ............. 370/473 |
| 6,473,397 | B1 | * | 10/2002 | Au ....................... 370/223 |
| 6,587,470 | B1 | * | 7/2003 | Elliot et al. ............... 370/404 |
| 6,597,826 | B1 | * | 7/2003 | Ramaswami et al. ......... 385/17 |

OTHER PUBLICATIONS

U.S. Appl. No. 09/703,056, Brewer et al., filed Oct. 31, 2000.

U.S. Appl. No. 09/703,038, Brewer et al., filed Oct. 31, 2000.

U.S. Appl. No. 09/702,958, Brewer et al., filed Oct. 31, 2000.

U.S. Appl. No. 09/703,027, Blackmon et al., filed Oct. 31, 2000.

U.S. Appl. No. 09/703,064, McDermott III et al., filed Oct. 31, 2000.

European Search Report issued for EP 01 30 9201.0, Mar. 25, 2004.

* cited by examiner

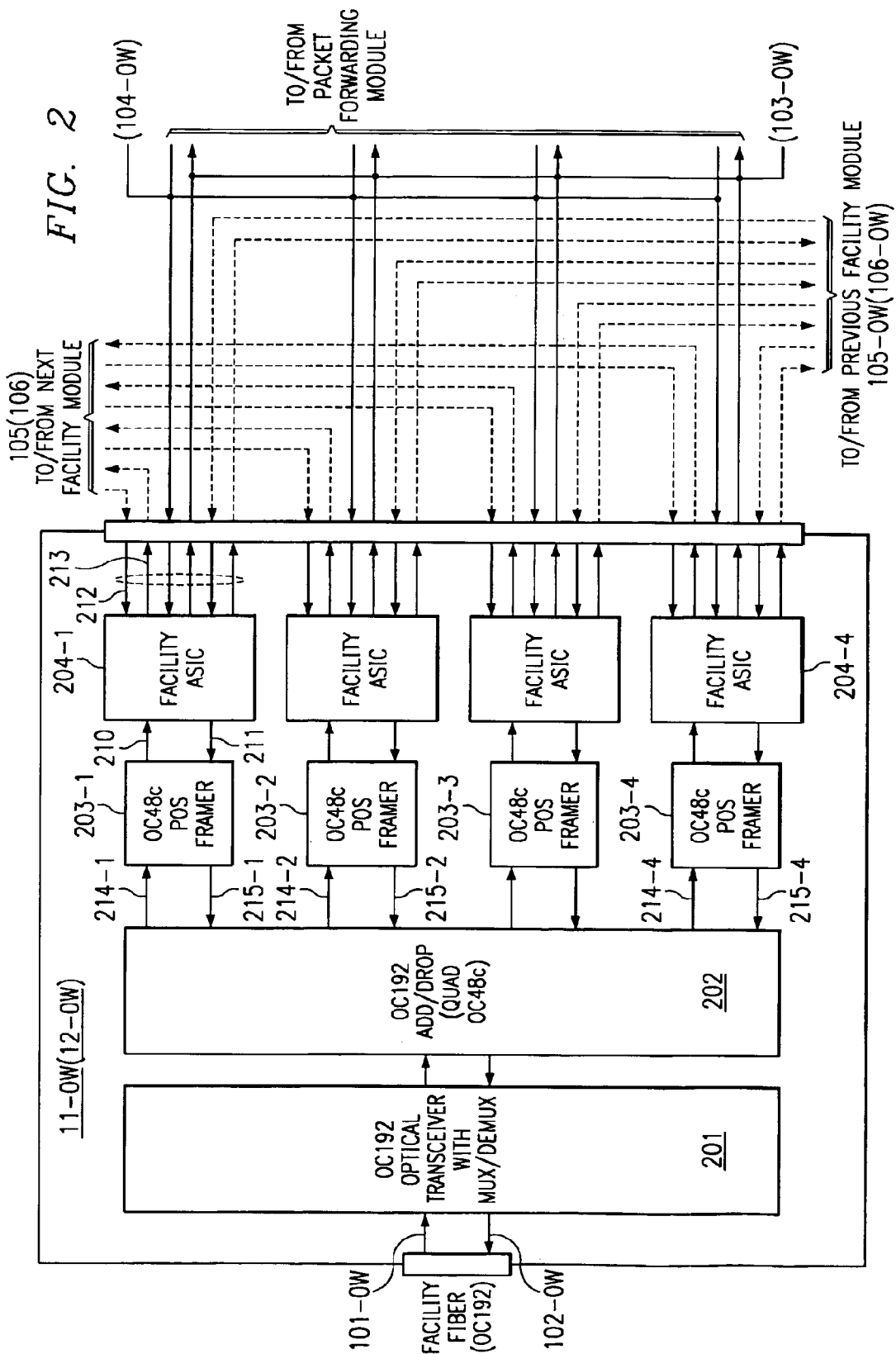

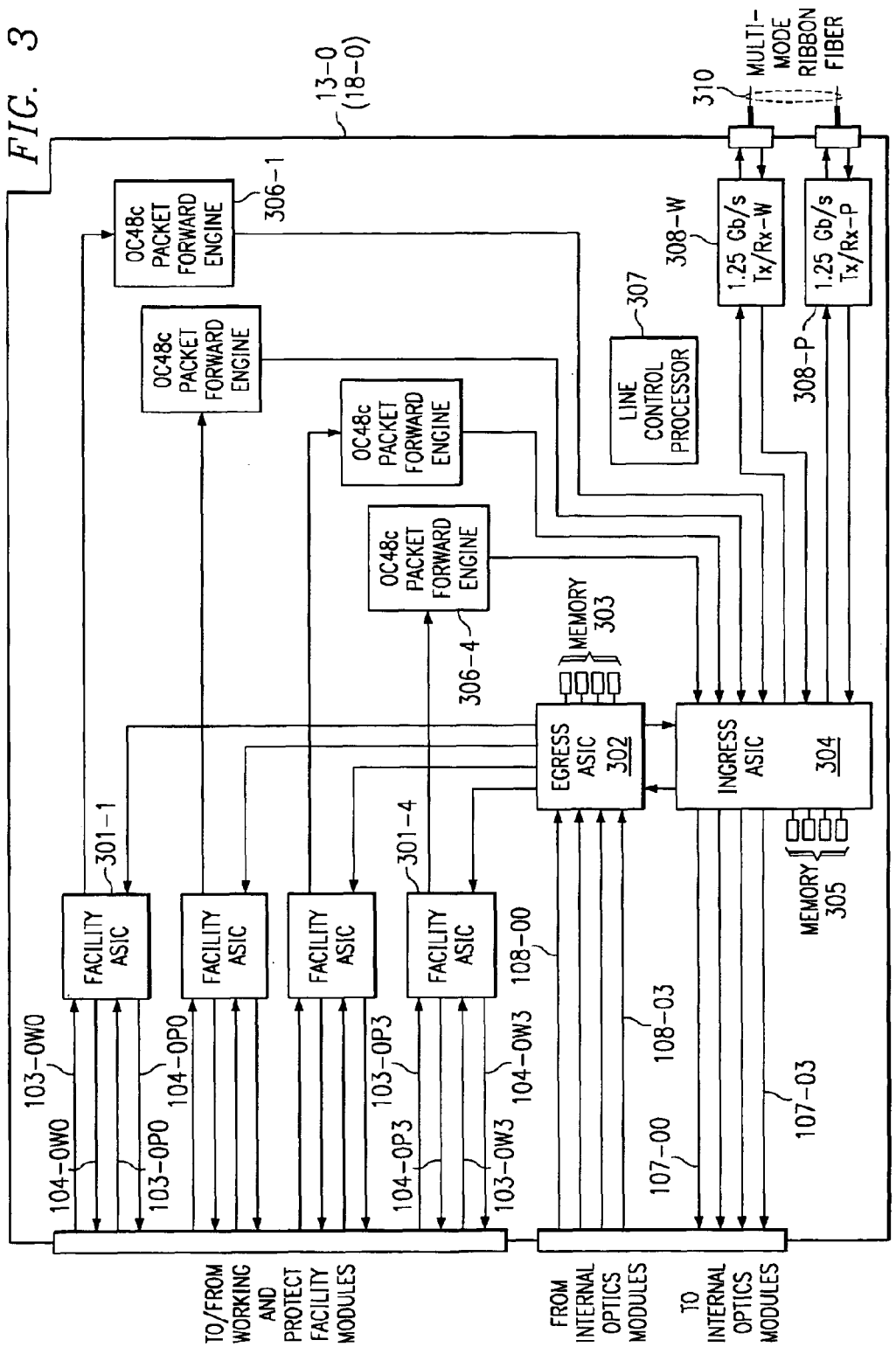

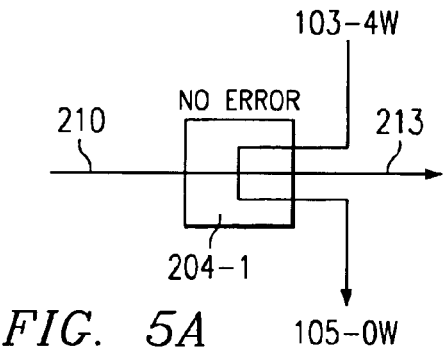
FIG. 5A
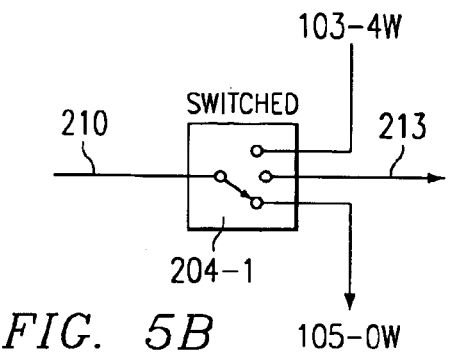
FIG. 5B
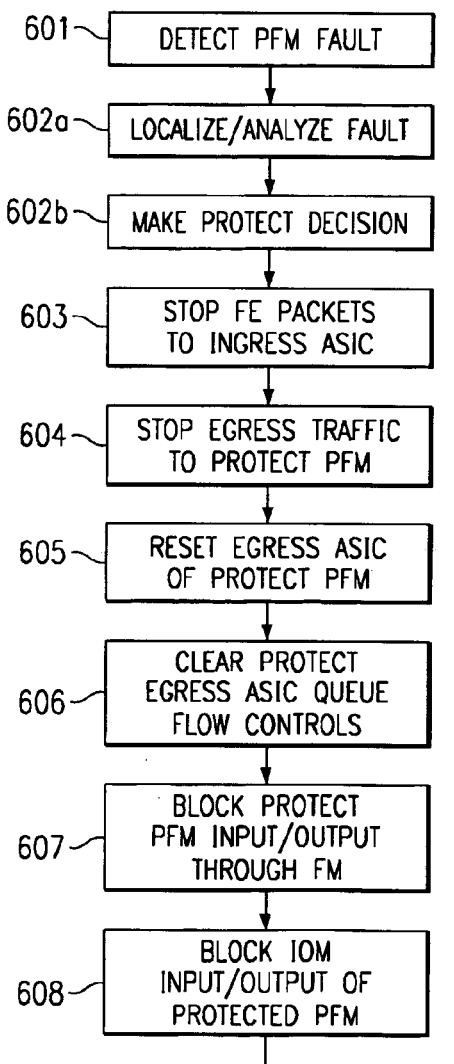
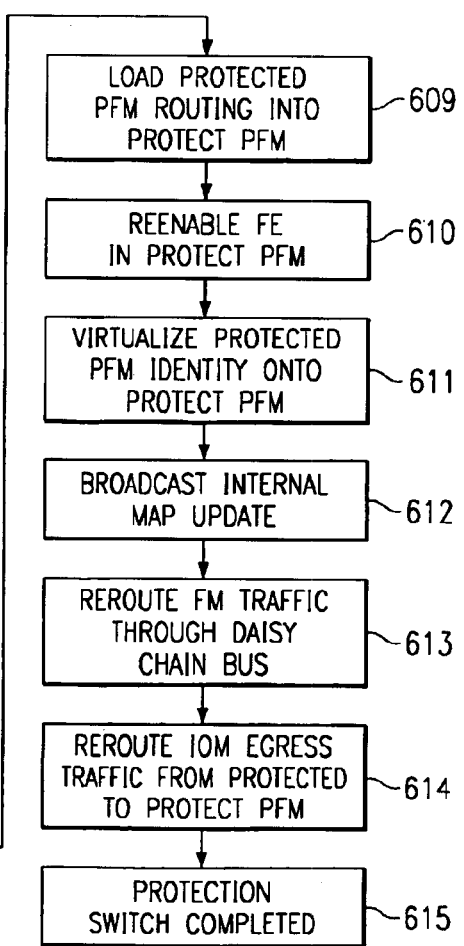
FIG. 6

ROUTER LINE CARD PROTECTION USING ONE-FOR-N REDUNDANCY

RELATED APPLICATIONS

This application is related to concurrently filed, co-pending, and commonly assigned U.S. application Ser. No. 09/703,057, filed Oct. 31, 2000, entitled "System And Method For IP Router With an Optical Core," to concurrently filed, co-pending, and commonly assigned U.S. application Ser. No. 09/703,056 filed Oct. 31, 2000, entitled "System and Method for Router Central Arbitration," to concurrently filed, co-pending, and commonly assigned U.S. application Ser. No. 09/703,038, filed Oct. 31, 2000, entitled "System and Method for Router Data Aggregation and Delivery," to concurrently filed, co-pending, and commonly assigned U.S. application Ser. No. 09/702,958 filed Oct. 31, 2000, entitled "Timing and Synchronization for an IP Router Using an Optical Switch," to concurrently filed, co-pending, and commonly assigned U.S. application Ser. No. 09/703, 027, filed Oct. 31, 2000, entitled "Router Network Protection Using. Multiple Facility Interfaces" and to concurrently filed, co-pending, and commonly assigned U.S. application Ser. No. 09/703,064, filed Oct. 31, 2000, entitled "Router Switch Fabric Protection Using Forward Error Correction," the disclosures of which are incorporated herein by reference.

TECHNICAL FIELD

This application relates to the field of optical communication networks, and particularly to large-scale routers for optical communication networks.

BACKGROUND

Routers form a central part of a data communication network and perform general routing. There can be multiple routers in a network. Information typically travels from one router to the next router, and eventually reaches the destination edge of the network. A destination edge router receives the information and decides where it goes from there. Typically it goes to an Internet service provider at the opposite edge of the edge router. If the destination is a household PC, the Internet service provider then sends the information to the destination computer. If there is corporate access to the network, the information may go from the edge router directly to a corporate site.

A fabric is a collection of devices which cooperatively provides a general routing capability. Internet protocol (IP) routers require protection from fabric failures, for example optical fabric, packet fabric, and switch element fabric failures. The prior art uses duplicated switch fabrics and line cards that feed both switch fabrics simultaneously but receive from only one switch fabric at any given time.

Internet protocol (IP) routers are not protected from line card failures with hot standby immediate acting protection mechanisms. Current designs depend on the external rerouting of IP packets and flows to restore packet traffic around failed line cards. This mode of protection is slow and is cumbersome to engineer and administer. A particular problem is that, in the event of failures of line cards or packet forwarding elements, it is impossible to limit the effects of those failures to the router in which the failure occurs. The downstream and upstream peer routers have to change their routing tables and change their packet destinations and flows in order to reroute packets around the failed packet forwarding line card.

An alternative approach is to implement multiple packet forwarding line cards to provide redundancy. This approach, however is economically unattractive, in that it consumes multiple switch fabric ports, thus doubling the required port count of the switch fabric. This results inevitably in underutilizing any particular line card. In order for additional packet traffic to be rerouted onto a line card M in the event of failure of line card N, a network must be engineered such that line card M is operating continuously at less than its maximum capacity.

Without fast acting hot standby protection, a network must be engineered with duplex and multiple routers and with less than fully utilized traffic capacity on each port. Then in the event of a facility or port failure during operation, all traffic must be redirected from the failed port to another port, which is available but underutilized and which has enough intrinsic capacity to carry the additional traffic under such a failure circumstance.

The first problem is not what happens once the failure occurs, but the way the network must be engineered to provide this complex protection structure. Once duplex routers or multiple routers are engineered into the network to address this type of failure, then typically it is required to engineer additional line capacity into the network between those routers. Whereas an unprotected network might require only a single trunk that is 100% utilized between two routers, a protected network under current technology requires a second trunk. The utilization of each one of the trunks in the absence of failure falls to only 50%. This increases the cost not only of the equipment, but of the router itself that now includes redundancy, software costs relating to the intervening network capacity, fiber optic transmission capacity including increased overhead traffic between routers, and administrative and engineering effort.

In prior art schemes an internal failure within a router would have to be protected by rerouting of the trunk outside of that router, perhaps encompassing several other routers in an existing network. Failure of a cable at a router can in fact propagate significantly far through a network, resulting in substantial confusion to the network as it adjusts to reconfigured routing. The network must broadcast to much of the Internet any IP addresses, for example, that have changed. Thus, small localized failures produce impacts that ripple out through the network, even though their original cause may not have been significant.

Not only do the packets get re-routed, but there is of necessity broadcast information that has to be sent to various routers to handle the re-routed traffic. In situations where outages occur from time to time, this can become overwhelming to a network. Even in the best case, the time to perform a repair and restore the original configuration can cause network traffic to slow dramatically. Again, this affects the capacity of a network, which in the initial stage would have to be engineered for higher capacity than would otherwise be necessary.

A common problem is an intermittent fault in a network, coming into and going out of service repetitively, thereby causing the generation of rerouting messages almost continuously through the network, known in the industry as "route-flap," resulting in much non-useful traffic.

Consequently, there is a need in the optical network art for router systems and methods that provide protection in the event of a failure, requiring a smaller investment in equipment and engineering effort than in the prior art. Further, there is a need for router failure protection that requires minimal disruption and reconfiguration of the larger network, and that provides seamless continuity of service in the event of a single point of failure.

SUMMARY OF THE INVENTION

The present invention is directed to a system and method which partition the router line cards, thereby separating the packet forwarding functions from the physical port interfaces or facility modules and also separating the packet forwarding functions from any internal router fabric interfaces. This enables multiple line cards to access any particular set of external facility or internal fabric paths. A method in accordance with the present invention further provides data and control paths that allow any failed working line card within a protection group to be switchably replaced by another line card, which is provided exclusively for protection purposes within the protection group. In particular, a serial bus structure on the port side of a line card allows any optical port within a given protection group to access the protection line card for that group. Incremental excess capacity across the router fabric is provided, so that the protection line card can request and receive grants to transmit packets to the fabric. Logical mapping of line card addressing and identification is used, such that a protection switch of a line card is managed locally and is transparent to other line cards in the router and to all external peer routers.

A benefit of this approach is that one for N protection ratios of the line cards, where N is some integer greater than two, can be achieved, which are very economical, yet provide sufficient system and network availability with acceptable protection switch time performance. An attractive protection switch time is generally any time under 100 milliseconds.

In an alternate embodiment, protection line cards can be used routinely for low priority traffic in the absence of failure of the working line cards. This low priority traffic can be interrupted to allow the protection line card to switch over to handle higher priority traffic previously carried by a failed working line card. In this approach it is not necessary to engineer network links of less than full capacity to allow for rerouting in the event of individual line card failure. Consequently, all ports can be used to full capacity.

If a particular facility module needs to be removed for maintenance purposes on one data bus, the duplicate data bus is maintained intact, allowing for hot replacement of any of the facility modules, working and protect, even if a packet forwarding module protection switch is in effect at the time.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of primary objects of the present invention and thus are not in general protected against.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2 is a block diagram illustrating data flow through facility modules of a router in more detail;

FIG. 3 is a block diagram illustrating information flow through a typical packet forwarding module;

FIGS. 5A and 5B are schematic diagrams illustrating the functioning of a facility ASIC in the normal working mode and in the protection switch mode respectively; and FIG. 6 is a flow diagram outlining the steps involved in performing an automatic PFM protection switch, in accordance with an embodiment of the present invention.

DETAILED DESCRIPTION

Figure 1A:
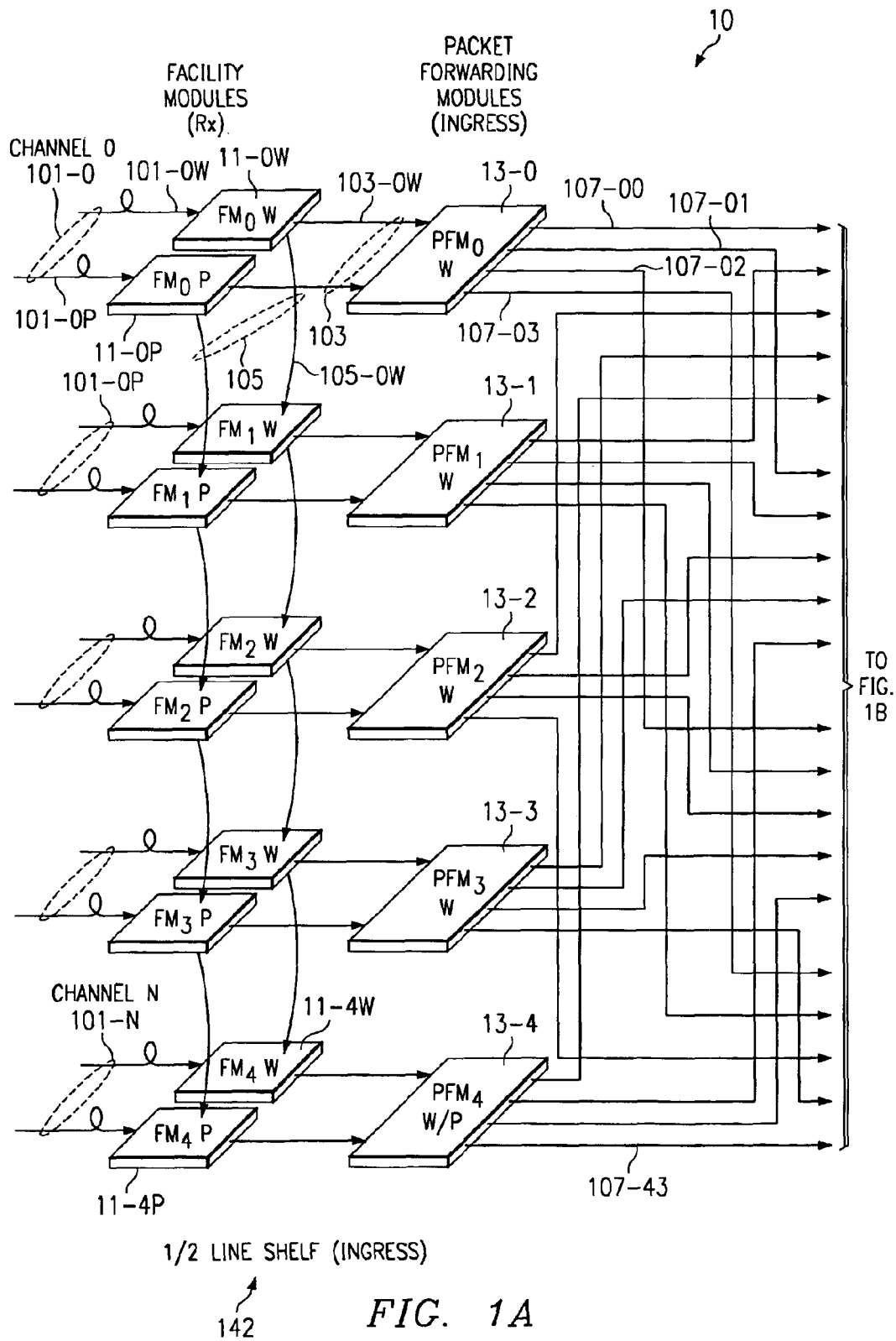
FIGS. 1A–1C form a schematic diagram showing an overview of the data paths through a router, in an embodiment of the present invention.
Figure 1B:
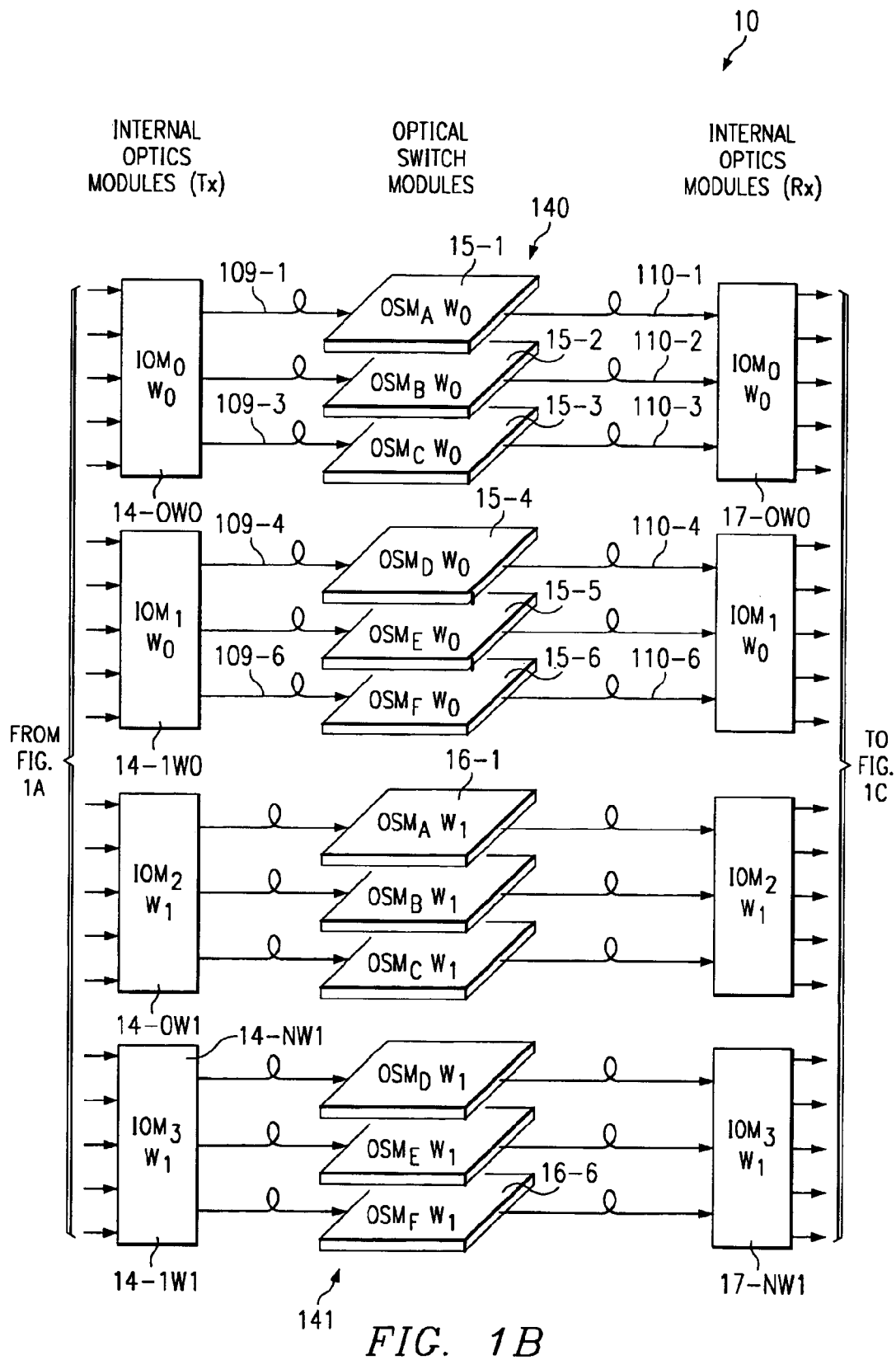
Figure 1C:
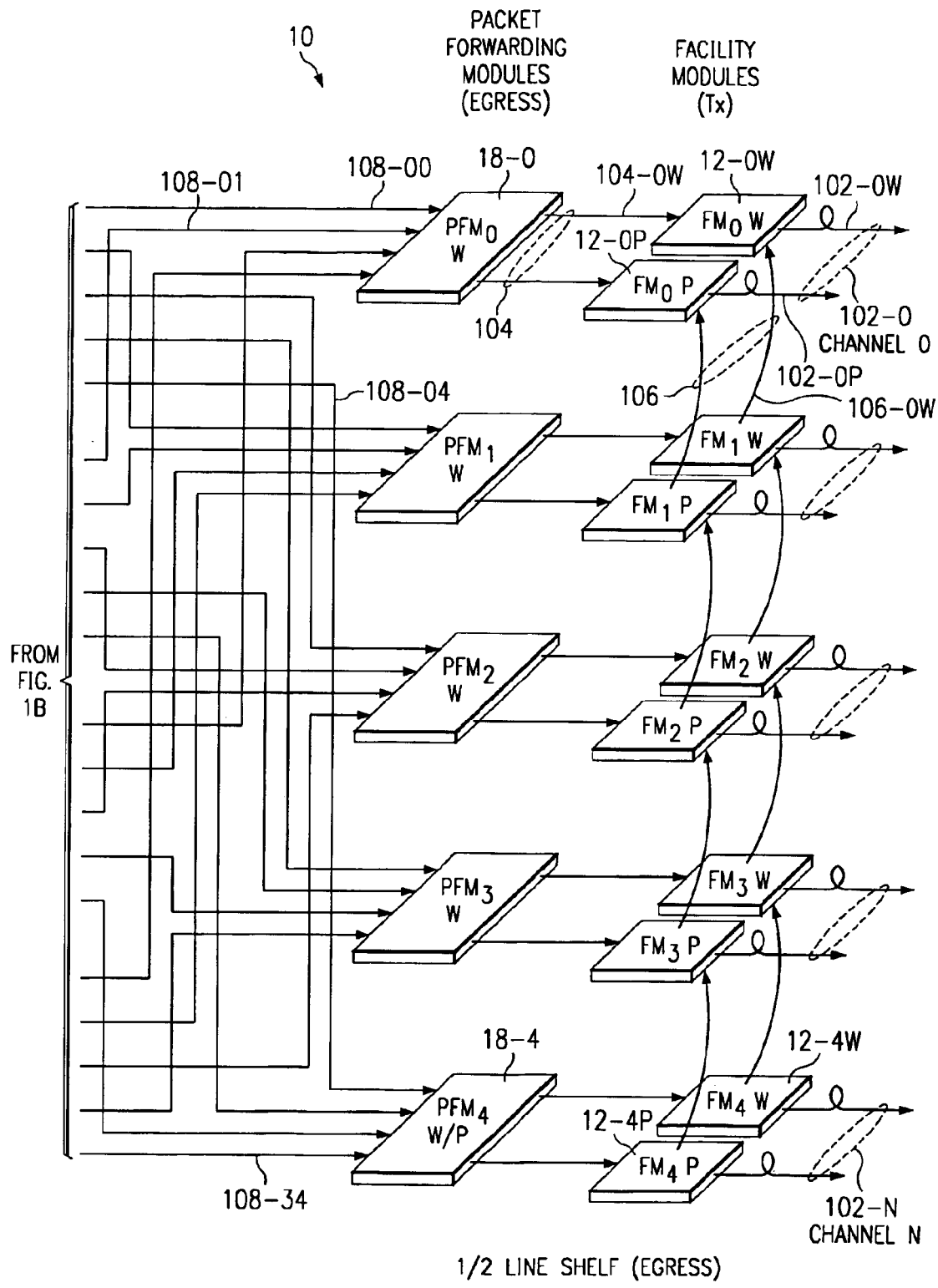

FIGS. 1A–1C form a schematic diagram showing an overview of the data paths through a router 10, in an embodiment of the present invention. For ease of understanding, FIGS. 1A–1C are partitioned into three sequentially adjacent panels. FIGS. 1A–1C do not show how router system 10 is wired, but simply illustrates the flow of data. At the upper left portion of FIG. 1A, an input 101-0 is a first SONET data channel, formatted as Packet-over-SONET in the present embodiment. Input 101-0 includes two optical fibers, namely a working input fiber 101-0W and a protect input fiber 101-0P. Fibers 101-0W, 101-0P carry duplicated information into router 10 from a peer source equipment e.g., another router or piece of SONET transmission equipment, compatible with the Packet-over-SONET format. Protect and working facility module cards 11-0P and 11-0W independently receive duplicate input from respective optic fibers 101-0P and 101-0W and perform an integrity check on the information by computing SONET parity and SONET framing words to determine if the information is valid, and independently check SONET protection switching 'K' Bytes. Both facility modules 11-0W and 11-0P perform essentially identical functions on the information. Each facility module independently evaluates the SONET frame and determines whether the information contained on it is valid. Facility modules 11-0W and 11-0P then extract packets from their respective SONET frames and transfer those packets over a packet bus 103 to a packet forwarding module (PFM) 13-0.

Working facility module 11-0W and protect facility module 11-0P respectively provide duplicate input interfaces 103-0W and 103-0P to packet forwarding module 13-0. A system controller (not shown in FIGS. 1A–1C) examines the status of facility modules 11-0W and 11-0P and selects as the in-service facility module the one that is receiving properly framed and bit-error-free packets on its input, in accordance with the SONET standard or as selected by SONET 'K' Bytes. Should the information coming into a facility module, for example facility module 11-0P, have bit errors or other defects, then facility module 11-0P raises an alarm at the system controller (not shown in FIGS. 1A–1C). The system controller then selects facility module 11-0W as the source of input from that channel, and facility module 11-0W strips the packets out of the SONET framing overhead and transfers those raw packets over industry standard bus 103-0W to packet forwarding module 13-0. Typically facility modules 11-0W and 11-0P, along with packet forwarding module 13-0, are contained in a line shelf, denoted in FIG. 1A as ½ line shelf 142 (ingress) and described below in more detail.

There are actually N+1 multiple packet forwarding modules 13-0 through 13-N. In FIG. 1A, N equals 4, providing for four working packet forwarding modules 13-0 through 13-3 and a fifth designated protect packet forwarding module 13-4. In this case protect packet forwarding module 13-4 is a spare module available to replace any working module 13-0 through 13-3. Should any one of working packet forwarding modules 13-0 through 13-3 fail, d then fifth packet forwarding module 13–4 can substitute for the failed packet forwarding module 13-0 through 13-3. This protection configuration is known as "one-for-four" protection. Similarly, on the output side of router 10 shown in the right side portion of FIG. 1C, packet forwarding modules 18-0 through 18-3 are all working modules, and packet forwarding module 18-4 is a spare protect packet forwarding module available as a replacement in the event of failure of any working packet forwarding module 18-0 through 18-3. Typically packet forwarding modules 18-0 through 18-4 are contained in a line shelf, denoted in FIG. 1C as ½ line shelf 14-3 (egress) and described below in more detail.

Protection works through a daisy-chain data bus 105 cascading from Channel 0 to Channel 1, to Channel 2, to Channel 3, and to Channel 4, linking facility modules 11-0W through 11-4W. A duplicate data bus interconnects from Channel 4 up to Channel 0, linking facility modules 11-4P through 11-0P. If for example packet forwarding module 13-1 were to fail, then input facility modules 11-IP and 11-1W send their traffic down data bus 105 linking facility modules 11-2 and 11-3 to facility module 11-4, which then switches those inputs to protect packet forwarding module 13-4. Thus if one channel fails, traffic, instead of going through the failed channel, goes down data bus chain 105 to designated protect module 13-4. If a particular facility module needs to be removed for maintenance purposes on one data bus, the duplicate data bus is maintained intact, allowing for hot replacement of any of the facility modules, working and protect, even if a packet forwarding module protection switch is in effect at the time. Similarly on the output side of router 10, output data is rerouted up a data bus chain 106 to Channel 1 and then out of router 10.

In operation, if PFM 13-1 fails, a microprocessor in the line shelf containing the failed packet forwarding module detects the failure, notices if the system is configured for one-for-four protection, and instructs switches on facility modules 11-1 through 11-4 to switch traffic that used to be in Channel 1 down to Channel 4. Channel 4 contains facility modules 11-4P and 11-4W on the input side and facility modules 12-4P and 12-4W on the output side respectively of router 10. These modules are connected to optical inputs and outputs only when utilizing protect PFM 13-4 or 18-4 as a working module and not as protection for PFMs 13-0 through 13-3 or 18-0 through 18-3. If PFM 13-4 or 18-4 is a working module, then daisy chain bus 105, 106 is not utilized in any way, and there are simply 5 working inputs and 5 working outputs. Accordingly, two modes of operation are available; namely one-for-N protection, for example one-for-four; or zero-for-five protection, meaning no protect modules and five working modules. Without requiring any wiring changes, router system 10 will function in either mode.

An alternative operating mode designates input 101-N and output 102-N for lower priority traffic. That traffic would be deliberately interrupted in the event of a failure of any of the packet forwarding modules carrying higher priority traffic and requiring a protect packet forwarding module to service that failure.

Information is transferred from PFM 13-0 to internal optics modules (IOMs) 14 as chunk payloads of data, such that a chunk contains typically 400 bytes of payload data Packets contained in virtual out queues of PFM 13-0 that are destined for the same egress PFM can be combined to form a single chunk payload of data. Thus, multiple small packets or just a segment of a larger packet can be loaded into a single chunk. A maximum of two chunks can be transferred from a PFM 13-0 to the IOMs 14-0W0 and 14-1W0 during each chunk period. The same chunks are replicated and transferred in parallel to IOMs 14-0W1 and 14-1W1.

IOM modules 14 encapsulate FEC code words as multiple redundant check symbols into each of the chunks. The present implementation uses a conventional interleaved Reed-Solomon FEC coding. IO modules 14-0W0, 14-1W0 provide duplicate working module capacity for a working zero optical switch plane. Similarly IO modules 14-0W1, 14-1W1 provide duplicate working module capacity for a working one optical switch plane. Switch plane pairs in this case are not configured as working and protect, but as working zero and working one copies respectively, such that copy zero switch plane containing optical switch modules 15-1 through 15-6 and duplicate copy one switch plane containing optical switch modules 16-1 through 16-6 each provide 6 optical switches worth of capacity.

IO module 14-0W0 transfers information from PFM 13-0 to one of three optical switch modules 15-1, 15-2 and 15-3. IO module 14-0W0 sends the information to the appropriate optical switch module based on the decisions of the central arbiter module (not shown in the figures), described in U.S. application Ser. No. 09/703,057 cited above. Illustratively, one input comes into an optical switch module and one output goes out from that same optical switch module. In an actual system, these inputs and outputs in fact provide connectivity across router system 10. FIG. 1B shows optical switch module 15-1 connected to an egress side internal optics module 17-0W0 through an output fiber 110-1. For clarity, six such optical switch modules 15-1 through 15-6 are shown in the top portion of FIG. 1B. In fact, in one implementation each of these optical switch modules has 64 optical fibers in and 64 optical fibers out, with these 64 optical fiber pairs fanning out to a great many different line shelves. Different shelves have multiple fiber inputs and outputs. Six parallel optical switch modules 15-1 through 15-6 provide 6 times the data capacity of a single switch module. Other embodiments can have for example, 36 of these modules rather than six.

Chunks of information are sent individually through optical switch modules 15-1 through 15-N and 16-1 through 16-N and received by IO modules 17 on line shelves at the egress side of router 10. IO module 17 checks the FEC check symbols to validate the accuracy of the data bits within the chunk. It then removes the FEC check symbols and transfers the resulting chunk payloads to packet forwarding module 18-0, 18-1, 18-2, 18-3, or 18-4 as appropriate for each destination address. Similarly, the working one optical switch plane containing optical switch modules 16-1 through 16-N does substantially the same thing in parallel. Thus, working zero and working one optical switch planes perform this process duplicatively and in parallel. This allows the packet forwarding modules on the egress side, such as PFM 18-0, to select those chunk payloads that are error free either from working zero or from working one optical switch plane on a chunk by chunk basis. If there is an error in an optical switch, then egress PFM modules 18-0 through 18-N can identify which working plane, zero or one, is accurate. Consequently errors in a switch are contained and do not ripple out through the network.

If there are only a few bit errors going through a switch, those errors can be corrected in real time by FEC decoding in IO modules 17. If a path through a working zero optical switch fails completely, then a path through the working one optical plane can be utilized instead. Further, because each IO module 17 computes the corrupted bits and how many bits were corrected on every path of the system, IO modules 17 provide a detailed fault analysis not only of the failed fiber or optical switch plane, but even down to the level of an individual switch defect, which then can also be isolated. Importantly, the data flowing across for example OS Module 15-1 and the data flowing across OS Module 16-1 in the absence of failures in the system are identical, byte for byte. This provides a hot standby, chunk for chunk.

After selecting error-free chunk payloads, packet forwarding modules 18-0 through 18-N then reassemble the chunks into individual IP packets and forward those packets across interface links 104, as previously described.

In FIGS. 1A–1C for the purpose of clarity, corresponding input and output functions are shown on separate circuit cards in separate ½ line shelves 142 and 143 respectively. In some embodiments corresponding input and output functions are combined on a single circuit card in a single line shelf combining ½ line shelves 142 and 143, thereby creating a folded configuration. For example, working input facility module 11-0W and working output facility module 12-0W can be combined on a single physical printed circuit card with two optical connectors, one in and one out. Similarly protect input facility module 11-0P and protect output facility module 12-0P can be combined on a single physical circuit card with two optical connectors, one in and one out. Likewise, input and output packet forwarding modules 13-0 and 18-0 also can be combined on a single physical circuit card in a single line shelf. In a folded configuration, if packet forwarding modules 13-0 and 18-0 share the same physical card, then there is a single card for Channel 0, likewise a single card each for Channels 1, 2, 3, and a fifth card for a Protect channel 4. Because there is a single physical card for input and output functions, then if a card fails, the protection ratio is equal for both input and output modules on that card. In some embodiments internal optics modules 14-0W0 and 17-0W0 similarly share the same physical circuit card, which in the present implementation is contained in the same line shelf 142, 143 with combined input/output facility modules 11, 12 and combined input/output packet forwarding modules 13, 18.

FIG. 2 is a block diagram illustrating data flow through facility modules 11-0W and. 12-0W, for example, in more detail. Facility optical fibers are connected on the left through input and output interfaces 101-0W and 102-0W respectively. In a preferred embodiment shown in FIG. 2, for purposes of illustration input and output facility modules 11-0W and 12-0W occupy the same circuit board in the same line shelf in a folded configuration. In other embodiments, the input and output facility modules 11-0W and 12-0W are located on separate physical circuit cards.

A signal, e.g., a packet-over-SONET (POS) formatted IP packet, arrives at input 101-0W to a signal processing module 201 typically in a ten-Gbit/sec OC192 SONET datastream. Processing module 201 contains an optical receiver, an optical multiplexer and associated demultiplexer, and a transmitter associated with those. For example, the received signal is demodulated from optical input 101-0W into an electronic signal, and then demultiplexed from a single ten-Gbit-per-second datastream in this example down to a parallel bus at a lower data speed. That parallel bus of signals then leaves module 201 and goes into a processing module 202. Module 202 contains an OC192 demultiplexer, which extracts a single 2.5 Gbit/second OC48 substream out of the OC192 stream and delivers a packet-over-SONET (POS) input to a framer 203-1, which is an industry standard off the shelf component. Likewise, module 202 extracts the other three OC48 substreams and sends these to POS framers 203-2, 203-3, and 203-4 respectively. At this point there are four parallel 2.5 Gbit/sec SONET streams, one to each of four POS framers 203-1 through 203-4, which extract from each OC48 stream the individual IP packets. POS framers 203-1 through 203-4 first have to find the IP packets in the datastream and then have to extract the packets from the SONET continuous datastream. This is done on the four parallel OC48 streams. Once it has removed the packets from the SONET frame, each POS framer 203-1 through 203-4 delivers those packets to a facility ASIC 204-1 through 204-4 respectively.

The principal function of facility ASICs 204-1 through 204-4 is to send that information to an appropriate packet forwarding module (not shown in FIG. 2), in this case through an interface 103-0W consisting of four parallel interfaces for the four packet streams, or, if directed, to receive packets from an upstream neighboring facility ASIC on an interface 103-4W and switch 103-4W to 103-0W in a protect mode. Otherwise, in a working mode of operation, a facility ASIC sends the information out through interface 103-0W, and information input on 103-4W is directed through cascading protection bus interface 105-0W. The normal sequence is for a facility ASIC to take information from above and switch it below, letting the received traffic pass straight through onto interface 103-0W. All four of facility ASIC switches 204-1 through 204-4 are ganged, such that they operate in parallel. With faster buses, faster framers, or faster facility ASICs, a single ASIC or bus, for example, could perform the above described functions instead of four required at the present state of technology.

FIGS. 5A and 5B are schematic diagrams illustrating the functioning of a facility ASIC 204-1 in the normal working mode and in the protection switch mode respectively. If there is no failed packet forwarding module (PFM), then a facility ASIC 204-1 is configured as shown in FIG. 5A, which illustrates protection switching in a single direction. In this case, a received signal on input interface 210 is sent through to output 213, whereas the input protection bus 103-4W is connected to the output protection bus 105-0W. If a failure of an associated packet forwarding module is detected, a microprocessor (not shown) instructs facility ASIC 204-1 to go into the protection switch mode, illustrated in FIG. 5B. In this case, a signal from input 210 instead of going to output 213 is switched to output protection bus 105-0W, input protection bus 103-4W is open and there is no signal available at output 213. This protection process in essence switches input 210 either to output 213 or down through output protection bus 105-0W, depending on whether facility ASIC 204-1 has been instructed to execute a protection switch. The inverse directions going up the facility ASIC chain and out from the packet forwarding modules are essentially the reverse of FIGS. 5A and 5B. Information traveling the reverse direction, that is from router 10 outbound on facility interface 102-0W, arrives from packet forwarding module 18-0 on interface 104-0W. When there is no protection switch, the information goes directly through to facility module 12-0W, following the inverse of FIG. 5A. On the other hand, in the protection switch mode, the information is diverted through protection bus 106-0W.

Referring again to FIG. 2, on the egress side facility ASIC 204-1 directs the information packets through output link 211 to Packet-over-SONET framer 203-1, which receives a packet, inserts it into a SONET frame, producing a 2.5 gigabit/second datastream or parallel bus equivalent, and sends that frame to OC 192 add/drop multiplexer 202. Multiplexer 202 combines four 2.5 gigabit/second streams from POS framers 203-1 through 2034, multiplexes them together into a 10 gigabit/second datastream, and delivers them to optical transceiver 201. Transceiver 201 receives the 10 gigabit/second stream, which is formatted as a parallel bus, and multiplexes it into a single datastream, which modulates a laser diode. This produces a SONET ten-gigabit/second optical format, which is transmitted through outbound optical facility interface link 102-0W.

FIG. 3 is a block diagram illustrating information flow through a typical packet forwarding module 13-0 (18-0). Facility ASICs 301-1 through 301-4 on the ingress side receive packets from facility modules working and protect 11-0W and 11-0P through single links 103-0W0 through 103-0W3. A principal function of facility ASICs 301-1 through 301-4 on the ingress side is to select between the working and the protection facility modules, as represented by the information on, for example, incoming path 103-0W0 or 103-0P0. That selection is made based on the standard SONET criteria for defining if one or both of those incoming facility modules is flawed or failed and also based on any detection of local errors or failures on working facility module 11-0W or protect facility module 11-0P.

In the egress direction, a principal function of facility ASICs 301-1 through 301-4 is to duplicate the packet stream coming out of egress ASIC 302 and to send that packet stream out across both outgoing paths 104-0W0 and 104-0P0 to facility modules 12-0W and 12-0P (see FIG. 2).

Packet forwarding engines 306-1 through 306-4 are devices that inspect the packet headers of all of the incoming packets received on any of the selected working or protect facility modules that are associated with this particular packet forwarding module 13-0 (18-0). Based on the inspection of those headers, a determination of the intended destination of each packet can be made. The header information is stored by an ingress ASIC 304 in various queues and lists, which are used to determine for any given packet which output port of the router it should exit, when it should exit, and its relative priority. Actual packet data is stored by ingress ASIC 304 in an external RAM memory 305. Packet forwarding engine 306-1 through 306-4 also determines if any particular packet is intended for a local destination within this particular router and redirects it toward the main control processor of the router instead of transmitting it downstream out one of the output ports of the router to a peer router across the network.

Ingress ASIC 304, based on the states of the various queues that it maintains and based on the destination addresses of the various packets that are represented by headers in those queues, sends requests through optical transceiver units 308-W and 308-P across optical link 310 (typically multimode ribbon fiber) to the central arbiter (not shown in FIG. 3). The central arbiter determines, based on all of the packets that are being processed through the router in aggregate at any given time, which of the requests from a particular ingress ASIC should be granted and when it should be granted for transmission across the optical switch. Grants of those requests return across optical link 310 through transceivers 308-W and 308-P back to ingress ASIC 304. Ingress ASIC 304 uses that grant information to extract packets from memory 305 in the appropriate order and assembles them into chunk payloads. At the appropriate times ingress ASIC 304 sends those chunk payloads across channels 107-00 through 107-03 to internal optics modules 14-0W0 through 14-NW1 (see FIG. 1B).

On the egress side, information chunk payloads are received from the optical switch matrix indirectly through internal optics modules 17-0W0 through 17-NW1 (sec FIG. 1B) across links 108-00 through 108-03 into an egress ASIC 302. Egress ASIC 302 reconfigures the chunks into packets and again stores the packets in a memory 303 in the form of queues and structures. Egress ASIC 302 subsequently reads those packets out again into one of the four facility ASICs 301-1 through 301-4. At the facility ASIC, each of those packet streams is duplicated and sent in tandem to both working and protect facility modules 12-0W and 12-0P.

A line control processor 307 is primarily responsible for controlling the facility protection switching function by examining the SONET error and failure indications from facility modules 11-0W and 11-0P and also by analyzing the indications that facility ASICs 301-1 through 301-4 develop from those incoming signals. The appropriate switching decisions are made in software and logic and are then implemented by line control processor 307.

Figure 4:
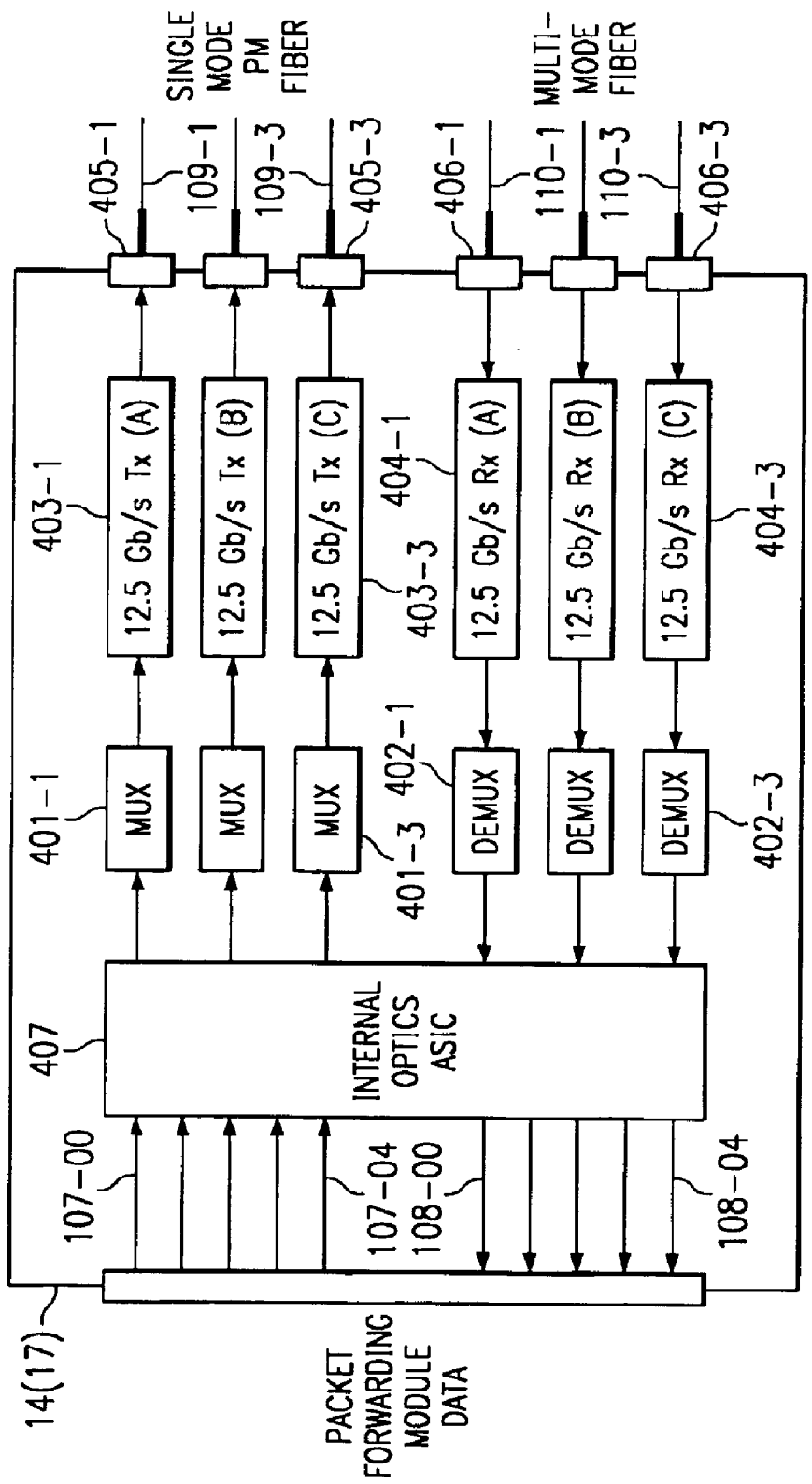
FIG. 4 is a block diagram representing information flow through a typical internal optics module, according to an embodiment of the present invention.

FIG. 4 is a block diagram representing information flow through a typical internal optics module 14 (17), according to an embodiment of the present invention. Internal optics module 14 receives chunk payloads of data via input links 107-00 through 107-04 from packet forwarding modules 13-0 through 13-N (see FIG. 3). An internal optics ASIC 407 selects chunk payloads from those inputs based on grant information that comes back from the central arbiter through each packet forwarding module 13-0 through 13-N. Internal optics ASIC 407 selects which inputs 107-00 through 107-04 will be passed at any point in time to three MUXs 401-1 through 401-3 and out through three 12.5-gigabit-per-second transmitters 403-1 through 403-3 toward the optical switch modules over single mode optical fiber links 109-1 through 109-3. Internal optics ASIC 407 is responsible for encapsulating the chunk payloads with the forward error correcting (FEC) headers and check sums that guarantee that the chunks pass across the optical switch without error, or that if errors occur, they are either corrected or detected. MUXs 401-1 through 401-3 convert input parallel format data to higher bit rate serial data.

In the egress direction in FIG. 4, optical signals coming in over multimode optical fiber links 110-1 through 110-3 pass through 12.5-gigabit-per-second receivers 404-1 through 404-3 and into three DEMUXs 402-1 through 402-3.

Receivers 404-1 through 404-3 convert the data chunks from optical to electrical bits and DEMUXs 402-1 through 402-3 convert these from a serial bit stream to lower bit rate parallel bit streams. Internal optics ASIC 407 compares the calculated FEC (forward error correction) check sums with the encoded check sums and determines if any errors have occurred across the switch matrix, corrects those errors if possible, and if not, provides alarm and performance monitoring information based on those errors. Internal optics ASIC 407 then strips away the FEC coding from the chunks and passes the resulting chunk payloads from the demux channels out through links 108-00 through 108-04 to packet forwarding modules 18-0 through 18-N.

In the egress direction, chunk payloads received from internal optics modules 17 are broken down into their original packets by egress ASIC 302 (see FIG. 3). The packets are stored in memory 303 and are then retrieved and delivered at the appropriate time to facility modules 12-0W and 12-0P. Each packet forwarding module 13 packages chunk payloads as described earlier and sends identical streams of chunk payloads to both working 1 and working 0 copies of the optical fabric via internal optics modules (IOMs) 14-0W0 through 14-NW1 (see FIG. 1B). Working 0 copy of the optical switch fabric includes internal optics modules 14-0W0 and 14-1W0, optical switch modules 15-1 through 15-6, and internal optics modules 17-0W0 and 17-1W0, whereas working 1 copy of the optical switch fabric includes internal optics modules 14-0W1 and 14-1W1, optical switch modules 16-1 through 16-6, and internal optics modules 17-0W1 and 17-1W1. For example, IOM 14-0W0 and IOM 14-0W1 each receive simultaneous sequences of chunk payloads from each packet forwarding module 13 that is transmitting through those two IOMs. Similarly, on the egress side each packet forwarding module items 18-0 through 18-N (see FIG. 1C) receives a simultaneous sequence of chunk payloads from IOMs 17-0W0 and 17-0W1, for example. In error-free normal working operation of both optical switch fabrics, the simultaneous sequences of chunk data delivered to each packet forwarding module are identical. In the event of a failure of any kind, either within a chunk or across multiple chunks on either copy zero or copy one of the optical switch fabric, the affected IOM is able to detect that failure based on comparison of the received FEC check sums with the calculated FEC check sums. When a failure on a particular chunk from either working zero or working one copy of the optical switch fabric is detected, the IOM inserts a failure indication downstream toward PFMs 18. This forces PFM 18 to select the error-free chunk data from the alternate copy of the optical switch fabric. This can be done individually for each chunk payload delivered to a particular PFM.

Referring again to FIG. 4, internal optics ASIC 407 detects any errors or failures of a given chunk on either copy zero or copy one of the switch fabric and inserts appropriate failure indications downstream toward all of the packet forwarding modules connected to it.

Referring again to FIG. 3, egress ASIC 302 receives those failure indications and selects on a chunk by chunk basis between either the copy zero or the copy one switch fabric. Only error-free chunk payloads from an unfailed switch fabric are inserted into memory and subsequently retrieved and broken out into packets, which are then transmitted toward facility modules 12-0W and 12-0P.

FIG. 6 is a flow diagram outlining the steps involved in performing an automatic PFM protection switch, in accordance with an embodiment of the present invention. The various associated apparatus modules are described above in connection with FIGS. 1A–1C, 2, 3, and 4.

In step 601 of the flow diagram, a PFM fault is detected by a line shelf control module (LSCM), described in U.S. application Ser. No. 09/703,057, cited above, which is interconnected through a control network (CNET) with LCP 307 in PFM 13 (see FIG. 3).

In step 602a the LSCM localizes and analyzes the PFM fault. For purposes of this discussion, the fault is assumed to occur in PFM 13-2 (18-2) and the protect PFM is assumed to be PFM 13-4 (18-4). It is further assumed that protect PFM 13-4 is operating in an "extra traffic" mode, such that it is carrying preemptable low priority traffic prior to the protection switch. This mode requires the most complex protection switch steps, which are sufficient to handle all other PFM protection switch cases. A similarly complex mode is the case in which the protect PFM is already protecting a working PFM when a higher priority working PFM fails. In the latter case, the protect PFM is already carrying data through the system and must be reconfigured for a different working PFM.

In step 602b the LSCM makes a protect decision. In the present embodiment the LSCM manages the PFM protection switch process.

In step 603 packet forwarding engines 306 on protect PFM 13-4 (18-4) are configured to stop sending packets to ingress ASIC 304-4. This allows ingress ASIC 304-4 to empty its queues of all the currently buffered packets. If ingress ASIC 304-4 has a built-in way to reset its memory queues, then this step will also be performed on protect PFM 13-4 (18-4). This step will also prevent peer router messages (incoming from the facility interfaces) from being sent to the master control processor (MCP) for protect PFM 134 (18-4). However, packet forwarding engines 306 on protect PFM 13-4 (18-4) are still able to generate administrative packets to communicate with the MCP, and flow control information can still be sent. This squelch operation could also be done at facility ASIC 301 on protect PFM 13-4 (18-4).

In step 604 egress IOMs 17 (see FIG. 4) are remapped to prevent any traffic addressed specifically for protect PFM 13-4 (18-4) from being received. This traffic is typically discarded. This is accomplished by disabling the output port on egress IOMs 17 connecting through lines 108 to egress ASIC 302-4 on protect PFM 13-4 (18-4).

In step 605, if egress ASIC 302-4 has a built-in way to reset its memory queues, then this step will also be performed on protect PFM 13-4 (18-4).

In step 606 flow control for protect PFM 13-4 (18-4) is cleared. This allows any module configured to send input to protect PFM 13-4 (18-4) to empty any buffers that may have been in a flow control "holding pattern." This is be accomplished by forcing a clear of flow control for all queues in egress ASIC 302-4 of protect PFM 13-4 (18-4). The updated flow control information is then distributed to the system through the normal flow control paths.

In step 607 all traffic associated with the facility modules 11-4W, 11-4P (12-4W, 12-4P) connected to protect PFM 13-4 (18-4) is blocked. This squelching is accomplished by protect PFM LCP 307-4 informing POS framers 203 to insert path alarm indication signals (AIS). This step can be omitted if no facility modules capable of interfacing with customers are associated with the protect PFM. Importantly, this action will prevent misconnects of packets to the wrong ports, which otherwise allow data to go out into the network through the facility modules associated with the protect PFM.

In step 608 the ingress input and egress output on IOMs 14 (17) are disabled that lead to protected PFM 13-2 (18-2).

Inputs to protected PFM 13-2 (18-2) from FMs are blocked. This prevents protected PFM 13-2 (18-2) from using system resources when it either has not failed or has failed uncontrollably. Shutting down the inputs to protected PFM 13-2 (18-2) allows the ingress and egress ASICs to clear their memory buffers.

In step 609 the specific routing tables of protected PFM 13-2 (18-2) are loaded into protect PFM 13-4 (18-4), along with any software state information, for example the current working/protect selection of facility modules for protected PFM 13-2 (18-2), and weighted random early discard (WRED) provisioning, a TCP protocol packet discard policy that reduces congestion.

Step 610 re-enables packet forwarding engines 306 in protect PFM 134 (18-4) to resume forwarding packets, although only idle packets should be received at this time. In other words, even though packet forwarding engines 306 are able to forward packets, they are not receiving any packets to forward, because IOMs 14 (17) and associated FMs still have their outputs blocked.

Step 611 changes the identity of egress ASICs 302-4 on protect PFM 13-4 (18-4) to virtualize protected PFM 13-2 (18-2). Also the flow control override in egress ASIC 302-4 is reversed to re-enable normal flow control operation using the new identity.

In step 612 the LSCM using the CNET informs the arbitration shelf control module (ASCM) of the PFM protection action, allowing the ASCM to configure the appropriate arbiter interface module (AIM) to route peer communication from the MCP to the appropriate PFM. This message received at the ASCM also configures the AIMs to clear the flow control settings for the unavailable port(s) (in this case protect PFM 13-4) and resend to all the PFMs in the system. The LSCM also informs the MCP that the physical ports associated with protect PFM 134 (18-4) are now unavailable. The MCP, in turn, informs the entire system with a system table update that these ports are unavailable.

In step 613 the FMs are mapped as controlled by the LSCM to route the traffic and to signal protect PFM 13-4 (18-4) to route remote processor interface (RPI) control to the FMs from protect PFM 13-4 (184) through the appropriate daisy chain bus 105 (106) using facility ASICs 204 (see FIGS. 2 and 5A–5B). After this step, the protected PFM packets will start being forwarded by protect PFM 13-4 (18-4).

In step 614 egress IOMs 17 are mapped to allow the received egress traffic normally directed to protected PFM 13-2 (18-2) to go to protect PFM 13-4 (18-4). This allows egress ASIC 3024 to start receiving the correct traffic on protect PFM 13-4 (18-4), thus completing the protection switch at block 615.

The steps to reverse the PFM protection switch are similar to the switch steps and are not detailed here. Of importance when reversing of PFM protection switch is to delay enabling the protect "extra traffic" until the working traffic is routed to the appropriate set of facility modules, to avoid misconnecting the data to the wrong ports.

Referring again to FIG. 3, each packet forwarding module 13 packages chunk payloads as described earlier and sends identical streams of chunk payloads to both working 1 and working 0 copies of the optical switch fabric via internal optics modules (IOMs) 14-0W0 through 14-NW1 (see FIG. 1B), which encapsulates the chunk payloads into chunks. Working 0 copy of the optical switch fabric (see FIG. 1B) includes internal optics modules 14-0W0 and 14-1W0, optical switch modules 15-1 through 15-6, and internal optics modules 17-0W0 and 17-1W0, whereas working 1 copy of the optical switch fabric includes internal optics modules 14-0W1 and 14-1W1, optical switch modules 16-1 through 16-6, and internal optics modules 17-0W1 and 17-1W1. For example, IOM 14-0W0 and IOM 14-0W1 each receive simultaneous sequences of chunk payloads from each packet forwarding module 13 that is transmitting through those two IOMs. Similarly, on the egress side each packet forwarding module 18-0 through 18-N (see FIG. 1C) receives a simultaneous sequence of 1 chunk payloads from IOMs 17-0W0 and 17-0W1, for example. In error-free normal working operation of both optical switch fabrics, the simultaneous sequences of chunk data delivered to each packet forwarding module are identical. In the event of a failure of any kind, either f within a chunk or across multiple chunks on either copy zero or copy one of the optical switch fabric, the affected IOM is able to detect that failure based on comparison of the received FEC check sums with the calculated FEC check sums. When a failure on a particular chunk from either working zero or working one copy of the optical switch fabric is detected, the IOM inserts a failure indication downstream toward PFMs 18. This forces PFM 18 to select the error-free chunk data from the alternate copy of the optical switch fabric. This can be done individually for each chunk payload delivered to a particular PFM.

Note that while embodiments of the invention have been described in terms of two SONET standards namely OC48 and OC192, alternative implementations of router 10 having an appropriate facility module can operate under other standards.

Embodiments according to the present invention are designed to protect against all single fault occurrences. Single faults include a single fault of a module, a single fault of a cable, or a single fault of a path. Accordingly, although some double faults are protected against, double faults generally lie beyond the scope of principal objects of the present invention and thus are not in general protected against.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication network comprising N substantially identical working line circuit cards, namely working line circuit cards w1, w2, . . . , wi, . . . , w(N+1), w(N) and M protect line circuit cards, namely protect line circuit cards p1, p2, . . . , pi, . . . p(M−1), p(M), each substantially identical with said working line circuit card, wherein N and M is each a positive integer such that M is smaller than N;

said line circuit cards having a working configuration such that each of said working line circuit cards w1, w2, ..., wi, ..., w(N−1), w(N) is connected in series into one of N respective separate data paths d1, d2, ..., di, ..., d(N−1), d(N) independent from any other of said working line circuit cards and having a protection switch configuration differing from said working configuration such that in at least one of said separate data paths di said working line circuit card wi is replaced by said substantially identical protect line circuit card pi, wherein said working line circuit cards and said protect line circuit cards are configured to extract packet information from memory and assemble it into chunk payloads;

wherein said data paths comprise solid state switches, such that said line circuit cards are connected into said data paths through said solid state switches; and wherein each of said data paths comprises two paired duplicate interface circuit cards differing in structure from said line circuit cards, said duplicate interface card configured to perform integrity checks on incoming information packets and to extract said information packets from a frame, each said duplicate interface card incorporating at least one said solid state switch.

2. The communication network of claim 1 wherein said solid state switches are 2×2 solid state switches.

3. The communication network of claim 1 wherein said solid state switches are ASICs.

4. The communication network of claim 1, further comprising an optical fiber cable interconnected with each of said paired duplicate interface circuit cards.

5. The communication network of claim 4 wherein said paired duplicate interface circuit cards are not configured to perform packet forwarding functions.

6. The communication network of claim 1, further comprising a serial bus structure interconnecting said data paths through said solid state switches.

7. The communication network of claim 1, further comprising a router system, said router system incorporating said working and said protect line circuit cards.

8. The communication network of claim 7, further comprising an optical switch fabric incorporated into said router system, each of said data paths being interconnected with said optical switch fabric through an optical fiber cable.

9. The communication network of claim 7 wherein said working and said protect line circuit cards are configured for one-for-four protection.

10. The communication network of claim 7 wherein said working and said protect line circuit cards are configured for zero-for-five protection.

11. The communication network of claim 1 wherein said data paths comprise duplex data paths.

12. A method of router line card protection comprising:
providing N substantially identical working line circuit cards, namely working line circuit cards w1, w2, ..., wi, ..., w(N−1), w(N) and M protect line circuit cards, namely protect line circuit cards p1, p2, ..., pi, ..., p(M−1), p(M), each substantially identical with said working line circuit card, wherein N and M is each a positive integer such that M is smaller than N;

connecting said line circuit cards in a working configuration such that each of said working line circuit cards w1, w2, ..., wi, ..., w(N−1), w(N) is connected in series into one of N respective separate data paths d1, d2, ..., di, ... d(N−1), d(N) independent from any other of said working line circuit cards;

passing network traffic in parallel through said N working line circuit cards in said working configuration;

if a fault is detected in a working line circuit card wi, then switching from said working configuration to a protection switch configuration differing from said working configuration such that in at least one of said separate data paths di said faulty working line circuit card wi is replaced by said substantially identical protect line circuit card pi; and passing network traffic in said protection switch configuration through protect line circuit card pi that in said working configuration previously passed through faulty working line circuit card wi, such that said faulty working line circuit card wi is protected by protect line circuit card pi- wherein said working line circuit cards and said protect line circuit cards connected into said data paths extract packet information from memory and assemble it into chunk payloads;

wherein said switching comprises connecting and disconnecting said line circuit cards into and out of said data paths using solid state switches; and wherein each of said data paths carries network traffic through two paired duplicate interface circuit cards differing in structure from said line circuit cards, said duplicate interface card configured to perform integrity checks on incoming information packets and to extract said information packets from a frame, each said duplicate interface card incorporating at least one said solid state switch.

13. The method of claim 12 wherein said solid state switches are 2×2 solid state switches.

14. The method of claim 12 wherein said solid state switches are ASICs.

15. The method of claim 12, further comprising passing network traffic through an optical fiber cable interconnected with each of said paired duplicate interface circuit cards.

16. The method of claim 12 wherein said paired duplicate interface circuit cards do not perform packet forwarding functions.

17. The method of claim 12, further comprising interconnecting an optical switch fabric with each of said data paths through an optical fiber cable.

18. The method of claim 12 wherein said switching further comprises:
interrupting packet forwarding activity in process, if any, internal to said protect line circuit card pi;
disabling all input and output network traffic through said protect line circuit card pi;
disabling all input and output of network traffic through said faulty working line circuit card wi;
loading specific routing tables of said faulty working line circuit card wi into said protect line circuit card pi;
reenabling internal packet forwarding functions internal to said protect line circuit card pi;
virtualizing the identity of said faulty working line circuit card wi into said protect line circuit card pi; and
rerouting all input and output network traffic that previously passed through said faulty working line circuit card wi, such that said network traffic is redirected through said protect line circuit card pi.

19. The method of claim 16, wherein said network traffic is rerouted through a serial bus structure.

20. The method of claim 12 wherein said switching occurs during a time interval of no greater than 100 milliseconds.

21. The method of claim 12, wherein said fault is detected by a line shelf control module.

22. The method of claim 12 wherein network traffic through said protect line circuit card pi in said protection switch configuration is not interrupted by an occurrence selected from the group consisting of malfunction, failure, removal, and replacement respectively of either one of said two paired duplicate interface circuit cards.

23. The method of claims 12 wherein network traffic through said protect line circuit card pi in said protection switch configuration is not interrupted by an occurrence selected from the group consisting of removal and replacement respectively of said faulty working line circuit card wi protected by said protect line circuit card pi.

24. The method of claim 12 wherein said switching of said line circuit card by said paired duplicate interface circuit cards is controlled by a control processor on said line circuit card.

25. The communication network of claim 1 wherein N is a positive integer greater than 2.

26. The communication network of claim 1 wherein M is a positive integer equal to one.

27. The communication network of claim 1 wherein none of said protect line circuit cards pi is connected into any of said data paths di in said working configuration.

28. The communication network of claim 1 wherein said M protect line circuit cards are a subset of said N working line circuit cards, such that said M protect line circuit cards pi are each connected into one of said data paths di in said working configuration and such that in said protection switch configuration said working line circuit card wi is replaced by said substantially identical protect line circuit card pi, wherein said working line circuit card wi and said substantially identical protect line circuit card pi are different line circuit cards.

29. The method of claim 12 wherein N is a positive integer greater than 2.

30. The method of claim 12 wherein M is a positive integer equal to one.

31. The method of claim 12 wherein none of said protect line circuit cards pi is connected into any of said data paths di in said working configuration.

32. The method of claim wherein said 12 protect line circuit cards are a subset of said N working line circuit cards, such that said M protect line circuit cards pi are each connected into one of said data paths di in said working configuration and such that in said protection switch configuration said faulty working line circuit card wi is replaced by said substantially identical protect line circuit card pi, wherein said working line circuit card wi and said substantially identical protect line circuit card pi are different line circuit cards.

33. The method of claim 12 wherein said protect line circuit card pi carries preemptable low priority network traffic in said working configuration.

* * * * *